(12) United States Patent
Kimura et al.

(10) Patent No.: US 10,521,542 B2
(45) Date of Patent: Dec. 31, 2019

(54) COMPUTER-READABLE RECORDING MEDIUM STORING ELECTRICAL DESIGN SUPPORT PROGRAM, ELECTRICAL DESIGN SUPPORT METHOD, AND INFORMATION PROCESSING APPARATUS

(71) Applicant: FUJITSU LIMITED, Kawasaki-shi, Kanagawa (JP)

(72) Inventors: Ryoko Kimura, Kawasaki (JP);
Kunitoshi Tanaka, Sendai (JP);
Yoshitaka Nishio, Yokosuka (JP);
Takehiro Yano, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 15/936,956

(22) Filed: Mar. 27, 2018

(65) Prior Publication Data

US 2018/0285506 A1    Oct. 4, 2018

(30) Foreign Application Priority Data

Apr. 4, 2017    (JP) .................................. 2017-074498

(51) Int. Cl.
*G06F 17/50*    (2006.01)
*G06T 19/20*    (2011.01)

(52) U.S. Cl.
CPC .......... *G06F 17/5072* (2013.01); *G06T 19/20* (2013.01); *G06T 2219/2012* (2013.01)

(58) Field of Classification Search
CPC ............................ G06F 17/5072; G06T 19/20
USPC ......................................... 716/118, 119, 122
See application file for complete search history.

(56) References Cited

U.S. PATENT DOCUMENTS

| | | | |
|---|---|---|---|
| 7,966,588 B1* | 6/2011 | Perry et al. | G06F 17/5036 707/E17.107 |
| 9,268,895 B2* | 2/2016 | Perry et al. | G06F 17/5072 |
| 10,176,288 B1* | 1/2019 | Carlson et al. | G06F 17/5081 |
| 2002/0004710 A1 | 1/2002 | Murao | |

FOREIGN PATENT DOCUMENTS

| | | |
|---|---|---|
| JP | 2001-307111 | 11/2001 |
| JP | 2009-205202 | 9/2009 |

\* cited by examiner

*Primary Examiner* — Sun J Lin
(74) *Attorney, Agent, or Firm* — Fujitsu Patent Center

(57) ABSTRACT

A non-transitory, computer-readable recording medium having stored therein a program for causing a computer to execute a process including: parts to be placed on a periphery of a printed-circuit board are placed in a first state, extracting first information for indicating an electrical-connection relationship between the printed-circuit board and the parts based on shape information for indicating shapes of the parts, placement information for indicating placement positions of the parts, and material information for indicating materials of the parts; when the parts are placed in a second state different from the first state, extracting second information for indicating an electrical-connection relationship between the printed-circuit board and the parts based on the shape information, placement information for indicating placement positions of the parts, and material information for indicating materials of the parts; extracting parts of the parts having a different electrical-connection relationship between the first information and the second information; and outputting a display signal to highlight the extracted parts.

6 Claims, 10 Drawing Sheets

FIG. 2A

| 121 IMPLEMENTATION SPECIFICATION TABLE |
|---|
| ID |
| NAME |
| DESIGN RULE (GAP, LINE WIDTH, AND THE LIKE) |
| : |

| 122 SUBSTRATE TABLE |
|---|
| ID |
| NAME |
| THE NUMBER OF LAYERS |
| OUTER SHAPE |
| THICKNESS |
| : |

| 123 ELEMENT TABLE |
|---|
| ID |
| NAME |
| MOUNTING FACE |
| PLACEMENT COORDINATES |
| : |
| LINK (ID) TO PARTS PIN |
| LINK (ID) TO 3D MODEL |

| 124 ELEMENT PIN TABLE |
|---|
| ID |
| NAME |
| COORDINATES |
| LAYER NUMBER |
| : |
| LINK (ID) TO BELONGING PART |
| LINK (ID) TO CONNECTED NET |
| LINK (ID) TO 3D MODEL |

| 125 LINE TABLE |
|---|
| ID |
| COORDINATES |
| LINE WIDTH |
| LAYER NUMBER |
| : |
| LINK (ID) TO CONNECTED NET |

| 126 NET TABLE |
|---|
| ID |
| NAME |
| : |
| LINK (ID) TO CONNECTED PARTS PIN |
| LINK (ID) TO CONNECTED LINE |
| LINK (ID) TO CONNECTED VIA |
| LINK (ID) TO CONTACT FACE PATTERN |
| LINK (ID) TO CONTACT MECHANISM PARTS |

| 127 VIA TABLE |
|---|
| ID |
| NAME |
| COORDINATES |
| LAYER NUMBER |
| : |
| LINK (ID) TO CONNECTED NET |
| LINK (ID) TO 3D MODEL |

| 128 FACE PATTERN TABLE |
|---|
| ID |
| SHAPE DATA |
| LAYER NUMBER |
| : |
| LINK (ID) TO CONNECTED NET |

| 129 3D MODEL TABLE |
|---|
| ID |
| TYPE   ELECTRICAL |
| MATERIAL (CONDUCTOR, NON-CONDUCTOR) |
| PLACEMENT COORDINATES |
| : |
| LINK (ID) TO CONNECTED PARTS |
| LINK (ID) TO CONNECTED VIA |
| LINK (ID) TO CONTACT MECHANISM PARTS |

FIG. 2B

| 131 |
|---|
| MECHANISM PARTS TABLE |
| ID |
| NAME |
| MOUNTING FACE |
| PLACEMENT COORDINATES |
| : |
| LINK (ID) TO CONNECTED NET |
| NET CHANGE FLAG |
| LINK (ID) TO NET BEFORE A CHANGE |
| LINK (ID) TO 3D MODEL |
| LINK (ID) TO CONTACT MECHANISM PARTS |

| 132 |
|---|
| 3D MODEL TABLE |
| ID |
| TYPE MECHANISM |
| MATERIAL (CONDUCTOR, NON-CONDUCTOR) |
| PLACEMENT COORDINATES |
| : |
| LINK (ID) TO CONNECTED PARTS |
| LINK (ID) TO CONNECTED VIA |
| LINK (ID) TO CONTACT MECHANISM PARTS |

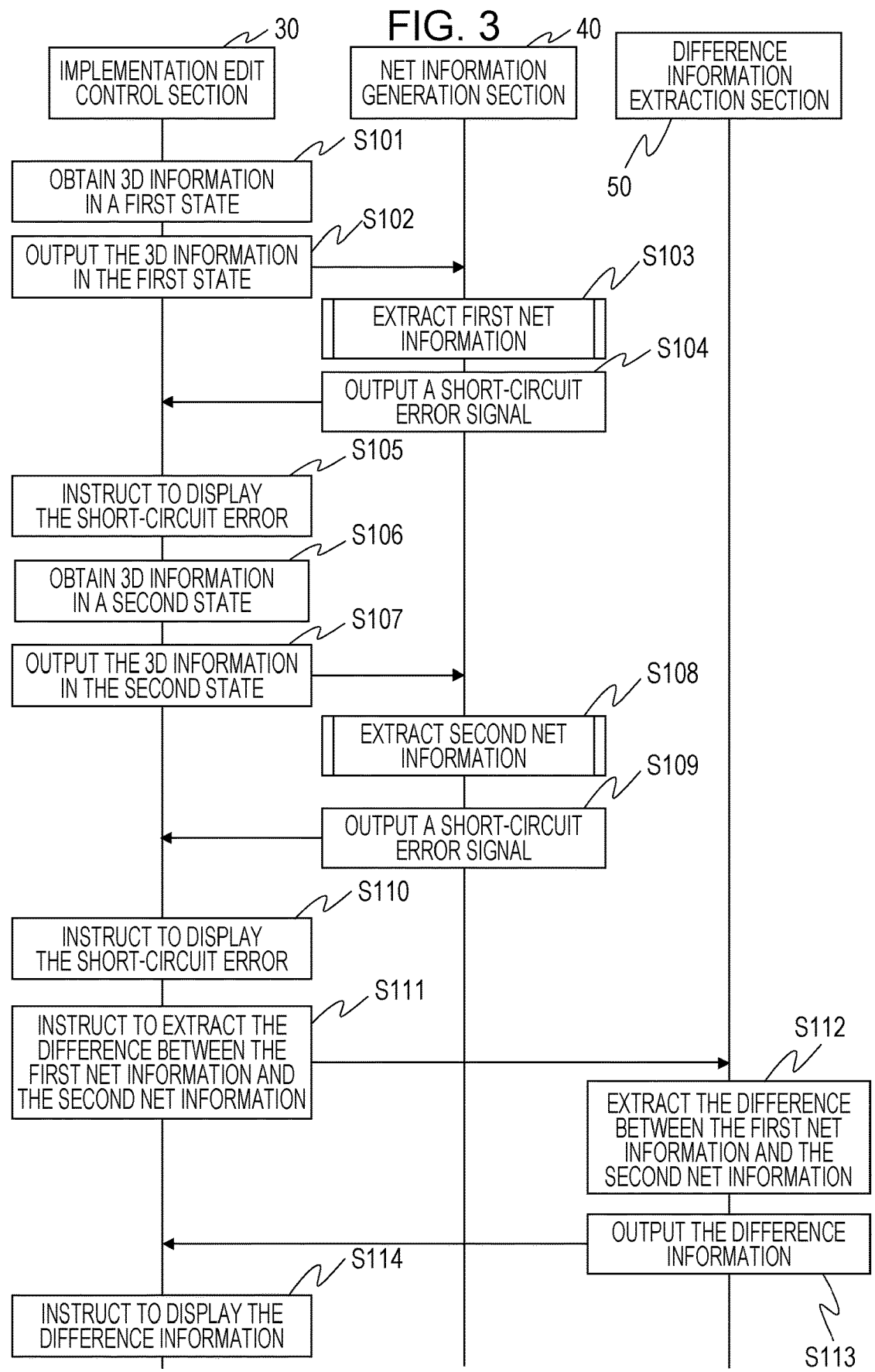

COMPUTER-READABLE RECORDING MEDIUM STORING ELECTRICAL DESIGN SUPPORT PROGRAM, ELECTRICAL DESIGN SUPPORT METHOD, AND INFORMATION PROCESSING APPARATUS

CROSS-REFERENCE TO RELATED APPLICATION

This application is based upon and claims the benefit of priority of the prior Japanese Patent Application No. 2017-74498, filed on Apr. 4, 2017, the entire contents of which are incorporated herein by reference.

FIELD

The embodiments discussed herein are related to a computer-readable recording medium storing an electrical design support program, an electrical design support method, and an information processing apparatus that supports electrical design.

BACKGROUND

It is known that various kinds of processing is performed based on mechanism computer aided design (CAD) data that are used by a CAD system, which is also referred to as a mechanism CAD system or a mechanical CAD system. For example, techniques for checking electrical conduction between mechanism parts of an electronic information device using mechanism CAD data are known (for example, refer to Japanese Laid-open Patent Publication No. 2009-205202). Also, techniques for comparing a plurality of mechanism CAD data in order to mechanically detect a product having a similar shape to that of a desired product from previous design data are known (for example, refer to Japanese Laid-open Patent Publication No. 2001-307111).

When various devices are designed, electrical design, in which a printed circuit board that functions as a control unit for controlling a device is designed, and mechanism design, in which the overall structures of the mechanism parts other than a printed circuit board are designed, are sometimes carried out in parallel with each other. Electrical design includes specification design, in which the specification of a printed circuit board is designed, circuit design, in which a circuit that realizes the specification designed by the specification design is designed, and implementation design, in which the circuit designed by the circuit design is implemented on a printed circuit board. In electrical design, such as circuit design, implementation design, and the like, an electrical CAD system is used as a design tool.

Mechanism design includes shape and structural design in which the shapes of mounted parts are designed, size and material design in which the size and the material of the mounted parts are designed, and cooling and noise analysis in which the heat generation state of the device and electromagnetic noise are analyzed, and the like. In mechanism design, a structural CAD system is used as a design tool.

In recent years, parts mounted on a device have a higher density of integration and are miniaturized due to technical advancement of the device, and the signal speeds have become faster. Consequently, the gap interference condition between a printed circuit board and parts placed on the periphery of the printed circuit board becomes severe. Accordingly, there is a risk of the occurrence of a short circuit in a device made on an experimental basis. An electrical designer checks whether or not a part mounted on a device is in contact with a conductive element placed on the printed circuit board, whether or not a part in contact is a conductor, and whether or not a conductor in contact is intentionally in contact, and the like in order to avoid the occurrence of a short circuit.

An electrical designer imports a three-dimensional model for indicating the shape information of the parts designed by a structural CAD system and placement information into an electrical CAD system, and gives net information for indicating connection relationships with the printed circuit board and the elements on the printed circuit board to the parts in contact with the printed circuit board, or the like. An electrical CAD system checks the presence or absence of a short circuit of the parts with a printed circuit board and the elements on the printed circuit board based on the net information given by the electrical designer.

However, specifications are often changed during the design both in electrical design and mechanism design, and there is a risk of not transferring a change of specifications, which are usually transferred using a specification document, or the like between an electrical designer and a mechanism designer. If a change of specifications is not transferred between an electrical designer and a mechanism designer, there is a risk that the electrical designer might not be aware of a change in the electrical connection due to the design change in the mechanism design. For example, if a connection material, such as a screw, a bolt, a boss, or the like that has connected a ground wiring line of a printed circuit board and a metal plate is deleted due to a design change in mechanism design, the connection between the ground wiring line of the printed circuit board and the metal plate becomes open. In an electrical CAD system, it is possible to check the presence or absence of a short circuit, but it is not possible to check the presence or absence of open. Accordingly, there is a risk that it is not possible for the electrical designer to find that the ground wiring line of the printed circuit board and the metal plate are not connected.

According to an embodiment, it is desirable to provide an electrical design support program that makes it easy to detect a change of net information for indicating the electrical connection relationship between parts to be mounted on a device and a printed circuit board and the elements placed on the printed circuit board when there is a design change in mechanism design.

SUMMARY

According to an aspect of the embodiments, a non-transitory, computer-readable recording medium having stored therein a program for causing a computer to execute a process of when a plurality of parts to be placed on a periphery of a printed circuit board are placed in a first state, extracting first information for indicating a first electrical connection relationship between the printed circuit board and the plurality of parts based on shape information for indicating shapes of the plurality of parts, placement information for indicating placement positions of the parts on the periphery of the printed circuit board, and material information for indicating materials of the plurality of parts; when the plurality of parts are placed in a second state different from the first state, extracting second information for indicating a second electrical connection relationship between the printed circuit board and the plurality of parts based on the shape information for indicating shapes of the plurality of parts, placement information for indicating placement positions of the parts on the periphery of the printed circuit board, and material information for indicating materials of the plurality of parts; extracting parts having a different electrical connection relationship between the first information and the second information; and outputting a display signal to highlight different electrical connection relationship between the first information and the second information for the extracted parts.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a diagram illustrating examples of tables included in an implementation database;

FIG. 2B is a diagram illustrating examples of tables included in a mechanism parts database;

FIG. 3 is a sequence chart of difference information extraction processing performed by the information processing apparatus illustrated in FIGS. 1A and 1B;

DESCRIPTION OF EMBODIMENTS

In the following, a description will be given of an electrical design support program, an electrical design support method, and an information processing apparatus that supports electrical design according to an embodiment with reference to the drawings. Note that the technical scope of the present disclosure is not limited to those embodiments.

Overview of Information Processing Apparatus According to Embodiment

In an information processing apparatus according to an embodiment, when a plurality of parts to be placed on the periphery of a printed circuit board are placed in a first state, first information for indicating an electrical connection relationship between the printed circuit board and the plurality of parts is extracted. Also, in the information processing apparatus according to the embodiment, when the plurality of parts are placed in a second state different from the first state, second information for indicating an electrical connection relationship between the printed circuit board and the plurality of parts is extracted In the information processing apparatus according to the embodiment, parts having a different electrical connection relationship between the first information and the second information are extracted, and a highlight display signal for indicating highlighting of the extracted parts is output. In the information processing apparatus according to the embodiment, parts having a different electrical connection relationship between the first net information and the second net information are displayed in a highlighted manner so that it is possible for an electrical designer to easily detect a change between the first net information and the second net information.

Figure 1A:
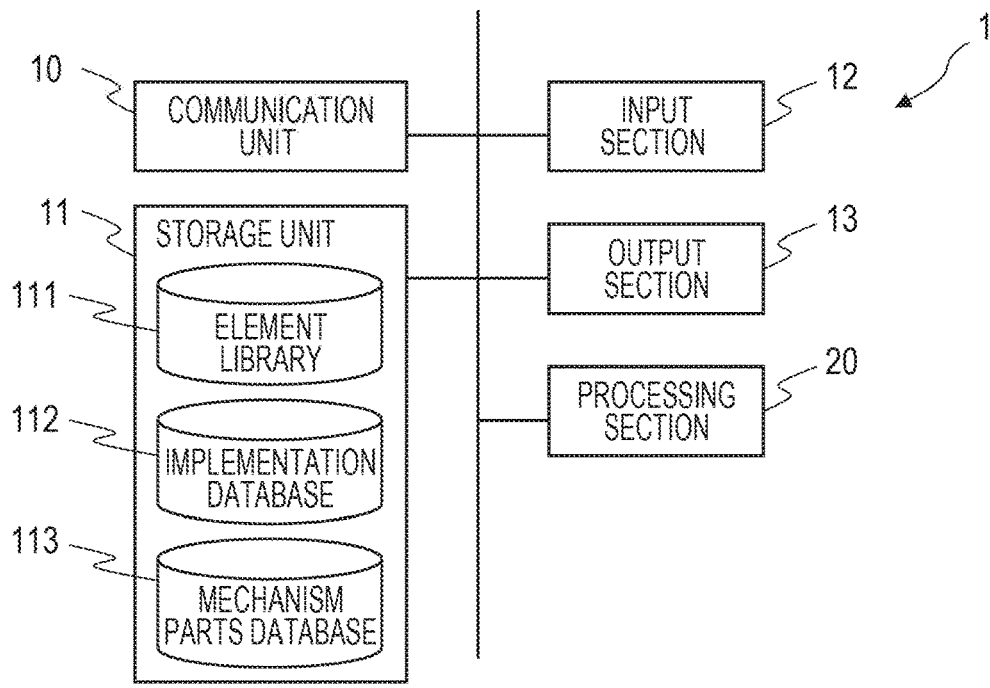
FIG. 1A is a circuit block diagram of an information processing apparatus according to a first embodiment.
Figure 1B:
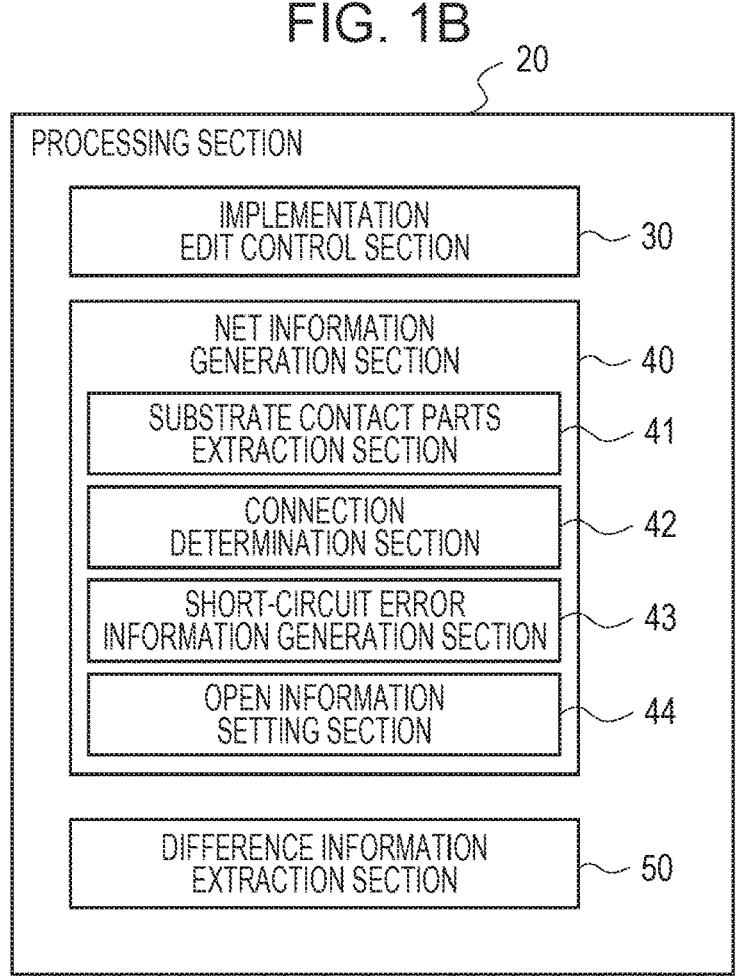
FIG. 1B is a functional block diagram of the processing section illustrated in FIG. 1A.

Configuration and Functions of Information Processing Apparatus According to First Embodiment FIG. 1A is a circuit block diagram of an information processing apparatus according to a first embodiment. FIG. 1B is a functional block diagram of the processing section illustrated in FIG. 1A.

The information processing apparatus 1 includes a communication unit 10, a storage unit 11, an input section 12, an output section 13, and a processing section 20.

The communication unit 10 performs communications with a server not illustrated in FIG. 1A, or the like via the Internet in accordance with Hypertext Transfer Protocol (HTTP). The communication unit 10 then supplies data received from the server or the like to the processing section 20. Also, the communication unit 10 transmits data supplied from the processing section 20 to the server, or the like. For example, the communication unit 10 may include a network interface card.

The storage unit 11 includes, for example, a semiconductor device, a magnetic tape device, a magnetic disk device, or an optical disc device, or any combination thereof. The storage unit 11 stores an operating system program, a driver program, an application program, data, and the like that are used by the processing by the processing section 20. For example, the storage unit 11 stores a difference information extraction program for causing the processing section 20 to perform difference information extraction processing that extracts the difference between the two pieces of different net information as an application program. The difference information extraction program may be installed from a computer-readable portable recording medium, for example, a CD-ROM, a DVD-ROM, or the like to the storage unit 11 using a publicly known setup program, or the like.

Also, the storage unit 11 stores data, and the like to be used by the input processing as data. Further, the storage unit 11 may temporarily store data to be temporarily used by the processing, such as input processing, and the like. For example, the storage unit 11 includes an element library 111, an implementation database 112, and a mechanism parts database 113. The element library stores information regarding individual elements, such as a resistance element, a capacitor, and the like that are placed on a printed circuit board.

FIG. 2A is a diagram illustrating examples of tables included in the implementation database 112. FIG. 2B is a diagram illustrating examples of tables included in the mechanism parts database 113.

The implementation database 112 includes an implementation specification table 121, a substrate table 122, an element table 123, an element pin table 124, a line table 125, and a net table 126. The implementation database 112 further includes a via table 127, a three-dimensional model table 129, and a face pattern table 128. The mechanism parts database 113 includes a mechanism parts table 131 and a three-dimensional model table 132.

The implementation specification table 121 stores a design rule, such as the line width and the gap of the wiring lines, and the like that are formed on a printed circuit board, and the substrate table 122 stores the number of layers, the outer shape and the thickness, or the like of the printed circuit board. The element table 123 stores the placement face of an element placed on the printed circuit board, the placement coordinates, and an ID of an element pin stored in the element pin table 124, and an ID of the three-dimensional model stored in the three-dimensional model table 129, and the like. The element pin table 124 stores the coordinates and the layer number, and the like on which an element pin is placed. The element pin table 124 stores an ID of an element stored in the element table 123, an ID of a net table stored in the net table 126, and further stores an ID of a three-dimensional model stored in the three-dimensional model table 129.

The line table 125 stores the coordinates and the line width of a wiring line formed on a printed circuit board, and the ID of a net table stored in the net table 126, and the like. The net table 126 stores the ID of an element pin stored in the element pin table 124, the ID of a wiring line stored in the line table 125, the ID of a via stored in the via table 127, and the like. The net table 126 further stores the ID of a face pattern stored in the face pattern table 128, and the ID of a part stored in the mechanism parts table 131.

The via table 127 stores the placement coordinates and the layer number of a via formed on a printed circuit board, the ID of a net table stored in the net table 126, and the ID of a three-dimensional model stored in the three-dimensional model table 129, and the like. The three-dimensional model table 129 stores the type for indicating an element of electrical design, the material for indicating either a conductor or an insulator, and the placement coordinates on a printed circuit board. The three-dimensional model table 129 further stores the ID of an element stored in the element table 123 and the ID of a via stored in the via table 127. The face pattern table 128 stores shape data for indicating the shape of a face pattern, the layer number of a face pattern formed on a printed circuit board, and the ID of a net table stored in the net table 126.

The mechanism parts table 131 stores the placement face and the placement coordinates of an element placed on a printed circuit board, the ID of a net table stored in the net table 126, and a net change flag for indicating the presence or absence of a change in the net information. If the change flag is "1", it indicates that there has been a change in the net information, whereas if the change flag is "0", it indicates that there has not been a change in the net information. The mechanism parts table 131 further stores the ID of a net table connected before the change, the ID of a three-dimensional model stored in the three-dimensional model table 132, and the ID of other part to be connected.

The three-dimensional model table 132 stores the type for indicating a part in mechanism design, the material for indicating either a conductor or an insulator, and the placement coordinates. Also, the three-dimensional model table 132 stores the ID of a part to be stored in the mechanism parts table 131.

The input section 12 may be any device as long as the device is capable of inputting data and, for example, is a touch panel, a key button, or the like. It is possible for an operator to input a character, a numeral, a sign, or the like using the input section 12. When the operator operates the input section 12, the input section 12 generates a signal corresponding to the operation. The generated signal is then supplied to the processing section 20 as an instruction of the operator.

The output section 13 may be any device as long as the device is capable of displaying a moving image, a frame, and the like and is, for example, a liquid crystal display, an organic electroluminescence (EL) display, or the like. The output section 13 displays the moving image in accordance with moving image data supplied from the processing section 20, frames in accordance with moving image data, or the like. Also, the output section 13 may be an output device that prints a moving image, frames, characters, or the like on a display medium, such as paper, or the like.

FIG. 3 is a sequence chart of difference information extraction processing performed by the information processing apparatus illustrated in FIGS. 1A and 1B. The processing section 20 includes one or a plurality of processors and the peripheral circuits thereof. The processing section 20 integrally controls the overall operation of the information processing apparatus 1 and is a CPU, for example. The processing section 20 performs processing based on a program (driver program, operating system program, application program, and the like) stored in the storage unit 11. Also, the processing section 20 is capable of executing a plurality of programs (application programs, and the like) in parallel.

The processing section 20 includes an implementation edit control section 30, a net information generation section 40, and a difference information extraction section 50. The net information generation section 40 includes a substrate contact parts extraction section 41, a connection determination section 42, a short-circuit error information generation section 43, and an open information setting section 44. Each of these sections is a functional module realized by a program executed by the processor included in the processing section 20. Alternatively, each of these sections may be implemented in the information processing apparatus 1 as firmware.

Difference information extraction processing by information processing apparatus according to first embodiment FIG. 3 is a sequence chart illustrating the difference information extraction processing by the information processing apparatus 1. The difference information extraction processing illustrated in FIG. 3 is performed mainly by the processing section 20 in cooperation with each element of the information processing apparatus 1 based on the program stored in the storage unit 11 in advance.

First, the implementation edit control unit 30 obtains the three-dimensional model information of a plurality of parts placed on a printed circuit board and on the periphery of a printed circuit board, which are mounted on a device placed in the first state from the implementation database 112 and the mechanism parts database 113 (S101). Next, the implementation edit control unit 30 outputs the three-dimensional model information obtained in the processing of S101 to the net information generation section 40 (S102).

Next, the net information generation section 40 extracts first net information based on the three-dimensional model information input by the processing in S102 (S103). The net information generation section 40 refers to the implementation database 112 and the mechanism parts database 113, and extracts first net information based on the shape information for indicating a plurality of parts, the placement information for indicating placement position, and the material information for indicating materials.

When the net information generation section 40 extracts the first net information, the net information generation section 40 determines whether or not a short circuit has occurred based on whether or not each of the plurality of parts is in contact with a printed circuit board and any elements placed on the printed circuit board. When the net information generation section 40 determines that a short circuit has occurred, the net information generation section 40 outputs a short error signal (S104). Next, the implementation edit control unit 30 outputs a short circuit error display signal for indicating the display instruction of a short circuit error to the output section 13 (S105). The output section 13 displays an image for indicating that a short circuit error has occurred when the short circuit error display signal is input. It is possible for the electrical designer to change the electrical design in accordance with the image, displayed on the output section 13, for indicating that a short circuit error has occurred. Also, it is possible for the mechanism designer to change the mechanism design in accordance with the image, displayed on the output section 13, for indicating that a short circuit error has occurred.

Next, the implementation edit control unit 30 obtains three-dimensional model information of a plurality of parts placed on the printed circuit board and on the periphery of the printed circuit board, in a second state different from the first state, that are mounted on the device from the implementation database 112 and the mechanism parts database 113 (S106). Next, the implementation edit control unit 30 outputs the three-dimensional model information obtained by the processing of S106 to the net information generation section 40 (S107).

Next, the net information generation section 40 extracts the second net information based on the three-dimensional model information input by the processing of S107 (S108). The net information generation section 40 refers to the implementation database 112 and the mechanism parts database 113 and extracts the second net information based on the shape information for indicating the shape of the plurality of parts, the placement information for indicating the placement positions, and the material information for indicating the materials.

When the net information generation section 40 extracts the second net information, the net information generation section 40 determines whether or not a short circuit has occurred based on whether or not each of the plurality of parts is in contact with the printed circuit board and any of the elements placed on the printed circuit board. If the net information generation section 40 determines that a short circuit has occurred, the net information generation section 40 outputs a short error signal (S109). Next, the implementation edit control unit 30 outputs a short circuit error display signal that indicates an instruction to display the occurrence of a short circuit error to the output section 13 (S110). When the output section 13 receives input of the short circuit error display signal, the output section 13 displays an image for indicating that a short circuit error has occurred.

Next, the implementation edit control unit 30 outputs a difference extraction instruction signal for indicating the extraction instruction of the difference between the first net information in the processing of S103 and the second net information extracted in the processing of S108 to the difference information extraction section 50 (S111). When the difference information extraction section 50 receives input of the difference extraction instruction signal, the difference information extraction section 50 performs processing for extracting the difference between the first net information and the second net information (S112). The difference information extraction section 50 extracts a part having the change flag of "1" in the mechanism parts table 131 as a part having the difference between the first net information and the second net information.

Next, the implementation edit control unit 30 outputs the difference information for indicating the difference extracted in the processing of S112 to the implementation edit control unit 30 (S113). The implementation edit control unit 30 then outputs the difference information display signal for indicating the display instruction of the difference information to the output section 13 (S114). When the output section 13 receives input of the difference information display signal, the output section 13 displays an image for indicating the difference between the first net information and the second net information.

Figure 4:
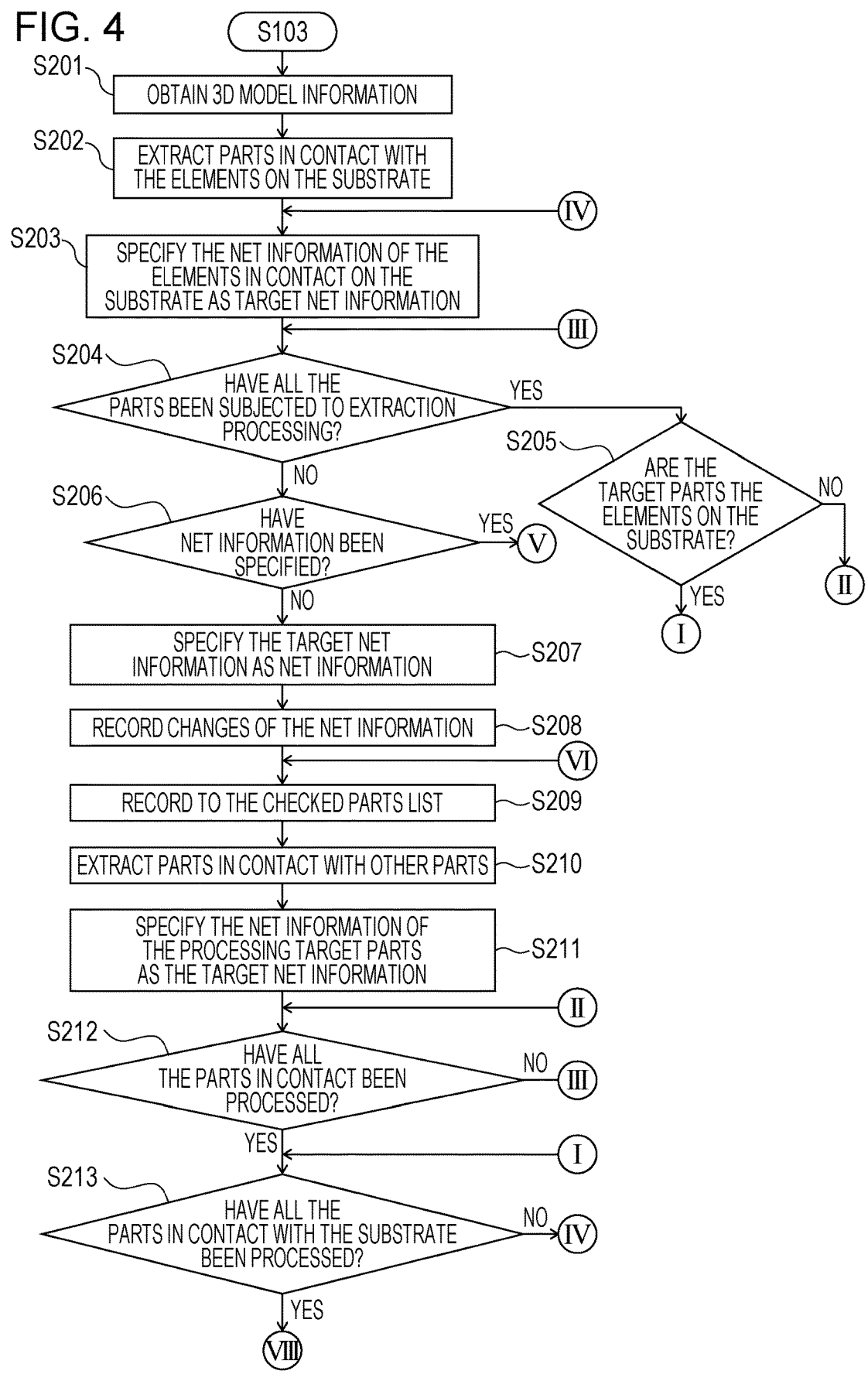
FIG. 4 is a flowchart (1 of 2) illustrating more detailed processing of the processing of S103 illustrated in FIG. 3.
Figure 5:
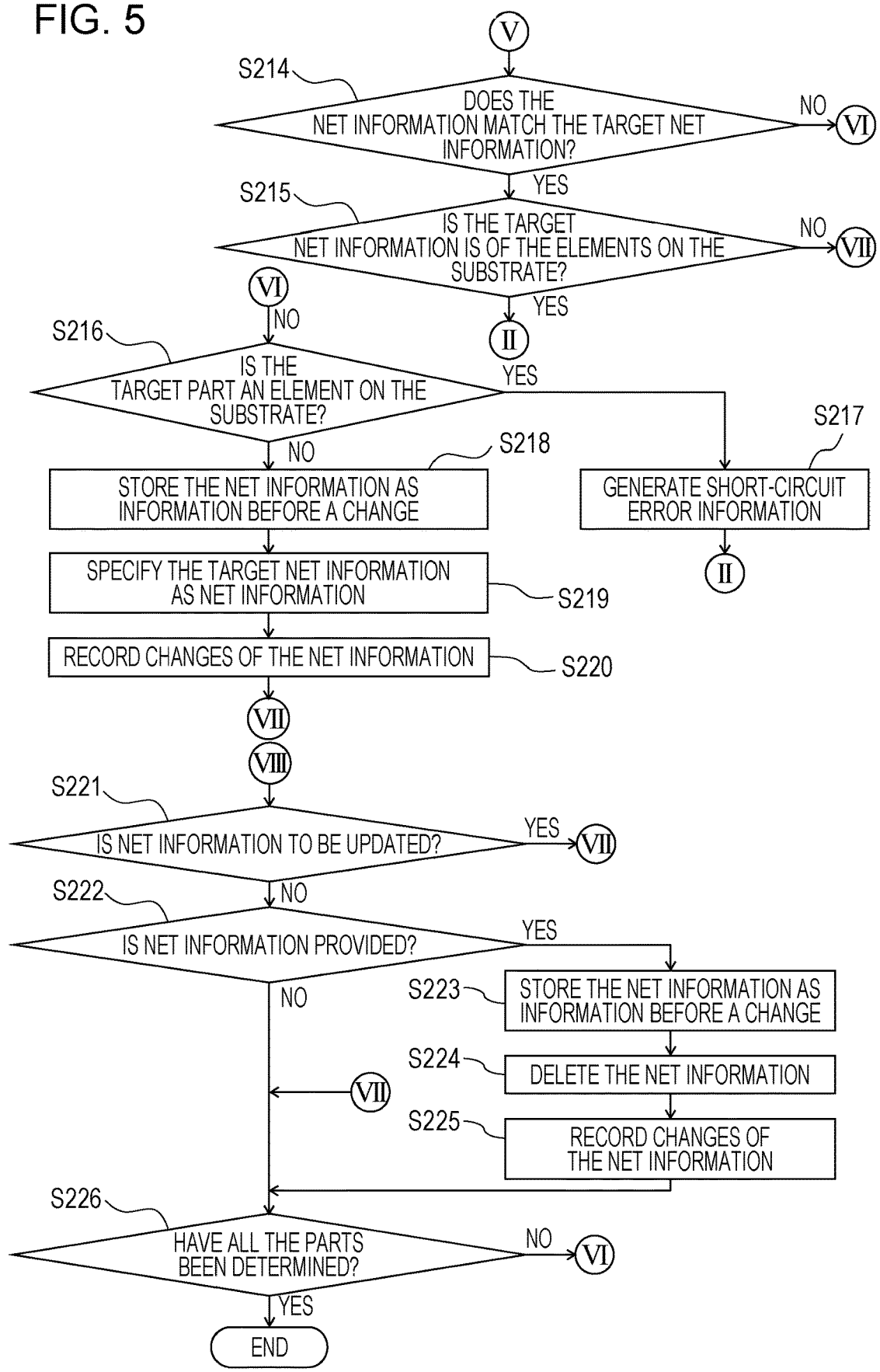
FIG. 5 is a flowchart (2 of 2) illustrating more detailed processing of the processing of S103 illustrated in FIG. 3.

FIG. 4 is a flowchart (1 of 2) illustrating more detailed processing of the processing of S103. FIG. 5 is a flowchart (2 of 2) illustrating more detailed processing of the processing of S103.

First, the substrate contact parts extraction section 41 obtains the three-dimensional model information input in the processing of S102 (S201) and extracts a part in contact with the printed circuit board and the conductive elements placed on the printed circuit board based on the obtained three-dimensional model information (S202). The substrate contact parts extraction section 41 extracts the placement coordinates and the shape of the part from the mechanism parts table 131 and the three-dimensional model table 132, and extracts the part in contact with a conductive element placed on the printed circuit board from the extracted placement coordinates and shape.

Next, the substrate contact parts extraction section 41 specifies the net information of the printed circuit board and the elements on the printed circuit board that are in contact with the part extracted in the processing of S202 as the target net information of the net information extraction processing (S203). Specifically, the substrate contact parts extraction section 41 specifies the ID of the net table corresponding to the printed circuit board and the element on the printed circuit board that are in contact with the part extracted in the processing of S202 in a parameter NET for indicating the target net information.

Next, the connection determination section 42 determines whether or not the part that is targeted for the net information extraction processing has already been processed by the net information extraction processing (S204). The connection determination section 42 refers to a checked parts list stored in the storage unit 11 and determines whether or not the part that is targeted for the net information extraction processing has already been processed by the net information extraction processing. If the connection determination section 42 determines that the targeted part has been processed by the net information extraction processing (S204—YES), the connection determination section 42 determines whether or not the targeted part is an element on the printed circuit board (S205). If the connection determination section 42 determines that the targeted part is an element on the printed circuit board (S205—YES), the processing proceeds to S213. Also, if the connection determination section 42 determines that the targeted part is not an element on the printed circuit board (S205—NO), the processing proceeds to S212.

If the connection determination section 42 determines that the part has not been processed by the net information extraction processing (S204—NO), the connection determination section 42 determines whether or not the net information of the part targeted for the net information extraction processing is specified (S206). Specifically, the connection determination section 42 determines whether or not the ID of the net table of the link destination is specified in the mechanism parts table 131 corresponding to the part targeted for the net information extraction processing. The part that was determined to be electrically connected to the printed circuit board and a conductive element placed on the printed circuit board by the net information extraction processing before the change has the ID of the link-destination net table that is specified in the mechanism parts table 131. On the other hand, the part that was determined not to be electrically connected to the printed circuit board and a conductive element placed on the printed circuit board by the net information extraction processing before the change, and a newly added part have the ID of the link-destination net table that is not specified in the mechanism parts table 131. If the net information of the part is determined to be specified by the connection determination section 42 (S206—YES), the processing proceeds to S212.

If the connection determination section 42 determines that the net information of the part is not specified (S206—NO), the target net information specified in the processing of S203 is specified as the net information of the part (S207). Specifically, the connection determination section 42 specifies the ID specified in the parameter NET in the processing of S203 as the ID of the link-destination net table in the mechanism parts table 131 of the part. Next, the connection determination section 42 records that the net information of the part targeted for the net information extraction processing has been changed (S208). Specifically, the connection determination section 42 sets the net change flag of the mechanism parts table 131 of the part targeted for the net information extraction processing to "1".

Next, the connection determination section 42 records the ID of the part in the checked parts list stored in the storage unit 11 in order to indicate that the net information extraction processing of the part was terminated (S209). Next, the connection determination section 42 extracts a part in contact with the part having the ID registered in the processing of S209 (S210). The connection determination section 42 refers to the implementation database 112 and the mechanism parts database 113 and extracts a part in contact with the part targeted for the net information extraction processing based on the shape information for indicating the shape of a plurality of parts and the placement information of the placement positions.

Next, the connection determination section 42 specifies the net information of any one of the parts extracted by the processing of S210 as target net information (S211). Specifically, the connection determination section 42 specifies the ID of the link-destination net table in the mechanism parts table 131 of any one of the parts extracted in the processing in S210 in the parameter NET. Next, the connection determination section 42 determines whether or not the net extraction processing has been performed for all the parts extracted by the processing of S210 (S212). If the connection determination section 42 determines that the net extraction processing has not been performed for all the parts extracted in the processing of S210 (S212—NO), the processing returns to S204.

If the connection determination section 42 determines that the net information extraction processing has not been performed for the part and the net information of the targeted part is specified (S206—YES), the connection determination section 42 determines whether or not the net information of the part matches the target net information (S214). Specifically, the connection determination section 42 determines whether or not the ID of the net table stored in the element table 123 or the mechanism parts table 131, which corresponds to the part matches the ID specified in the parameter NET. If the connection determination section 42 determines that the net information of the part matches the target net information specified in the parameter NET (S214—YES), the connection determination section 42 determines whether or not the part targeted for the net information extraction processing is an element on the printed circuit board (S215). Specifically, if the table corresponding to the part is the element table 123, the connection determination section 42 determines that the targeted part is an element on the printed circuit board. Also, if the table corresponding to the part is the mechanism parts table 131, the connection determination section 42 determines that the targeted part is not an element on the printed circuit board.

If the connection determination section 42 determines that the part targeted for the net information extraction processing is an element on the printed circuit board (S215—YES), the processing returns to S212. On the other hand, if the connection determination section 42 determines that the part targeted for the net information extraction processing is not an element on the printed circuit board (S215—NO), the processing returns to S209.

If the connection determination section 42 determines that the net information of the part does not match the target net information (S214—NO), the connection determination section 42 determines whether or not the part targeted for the net information extraction processing is an element on the printed circuit board (S216). If the connection determination section 42 determines that the part targeted for the net information extraction processing is an element on the printed circuit board (S216—YES), the short-circuit error information generation section 43 generates short-circuit error information for indicating the occurrence of a short circuit (S217). Next, the processing returns to S212.

If the connection determination section 42 determines that the part targeted for the net information extraction processing is not an element on the printed circuit board (S216—NO), the connection determination section 42 stores the net information of the part targeted for the net information extraction processing as information before the change (S218). Specifically, the connection determination section 42 stores the ID of the net table stored in the mechanism parts table 131 corresponding to the part as the ID of the link of the net table connected before the change.

Next, the connection determination section 42 specifies the target net information as net information of the targeted part (S219). Specifically, the connection determination section 42 stores the ID specified in the parameter NET as an ID of the net table stored in the mechanism parts table 131 corresponding to the targeted part.

Next, the connection determination section 42 records that the net information of the part targeted for the net information extraction processing has been changed (S220). Specifically, the connection determination section 42 sets the net change flag of the mechanism parts table 131 of the part targeted for the net information extraction processing to "1". Next, the processing returns to S209.

Subsequently, until when the connection determination section 42 determines that the net extraction processing has been performed for all the extracted parts in the processing of S210 (S212—YES), the processing of S204 to S212 is repeated. If the connection determination section 42 determines that the net extraction processing has been performed for all the extracted parts in the processing of S210 (S212—YES), the connection determination section 42 determines whether or not the net extraction processing has been performed for all the parts extracted in the processing of S202 (S213).

If the connection determination section 42 determines that the net extraction processing has not been performed for all the parts extracted in the processing of S202 (S213—NO), the processing returns to S203. Subsequently, until when the connection determination section 42 determines that the net extraction processing has been performed for all the parts extracted in the processing of S202 (S213—YES), the processing of S203 to S213 is repeated.

If the connection determination section 42 determines that the net extraction processing has been performed for all the parts extracted in the processing of S202 (S213—YES), the open information setting section 44 determines whether or not the net information of any one of the parts mounted on the device is updated (S221). Specifically, the open information setting section 44 refers to the checked parts list stored in the storage unit 11 and determines whether or not the net information extraction processing has been performed for each of the parts mounted on the device. If the open information setting section 44 determines that the net information of the parts has been updated (S221—YES), the processing proceeds to S226.

If the open information setting section 44 determines that the net information of the parts has not been updated (S221—NO), the open information setting section 44 determines whether or not there is net information of the parts (S222). Specifically, the open information setting section 44 determines whether or not the ID of the net table is specified as a link destination in the mechanism parts table 131 corresponding to the parts. If the open information setting section 44 determines that there is no net information of the parts (S222—NO), the processing proceeds to S226.

If the open information setting section 44 determines that there is net information of the part (S222—YES), the open information setting section 44 stores the net information of the part as the information before the change (S223). Specifically, the connection determination section 42 stores the ID of the net table stored in the mechanism parts table 131 corresponding to the part as the ID of the link of the net table connected before the change. Next, the open information setting section 44 deletes the net information of the part (S224). Specifically, the open information setting section 44 deletes the ID of the net table stored in the mechanism parts table 131 corresponding to the part. Next, the processing proceeds to S225 to record changes of the net information.

Next, the open information setting section 44 determines whether or not the processing of S221 has been performed for all the parts mounted on the device (S226). If the open information setting section 44 determines that the processing of S221 has not been performed for all the parts mounted on the device (S226—NO), the processing returns to S216. Subsequently, until when the open information setting section 44 determines that the processing of S221 has been performed for all the parts mounted on the device (S226—YES), the processing of S221 to S224 is repeated. When the open information setting section 44 determines that the processing of S221 has been performed for all the parts mounted on the device (S226—YES), the processing is terminated.

The net information generation section 40 performs the processing of S201 to S224 to extract first net information (S103) and generates short-circuit error information. Also, the net information generation section 40 performs the processing of S201 to S224 in S108 to extract second net information (S108) and generates short-circuit error information.

Operational Advantage of Heat Generation Density Calculation Method According to First Embodiment The information processing apparatus according to the first embodiment highlights parts having a different electrical connection relationship between the first net information and the second net information so that it is possible for an electrical designer to easily view a change in the connection relationship between the first net information and the second net information.

Figure 6A:
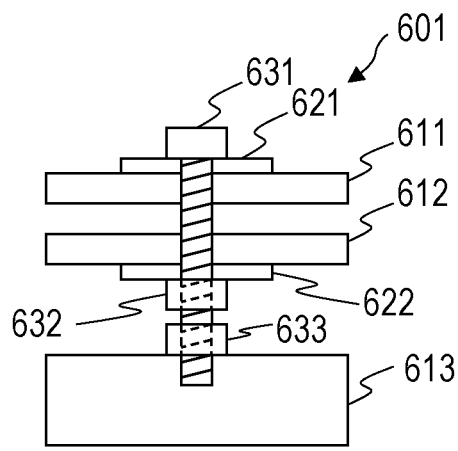
FIG. 6A is a diagram illustrating an example of a CAD image corresponding to first net information.
Figure 6B:
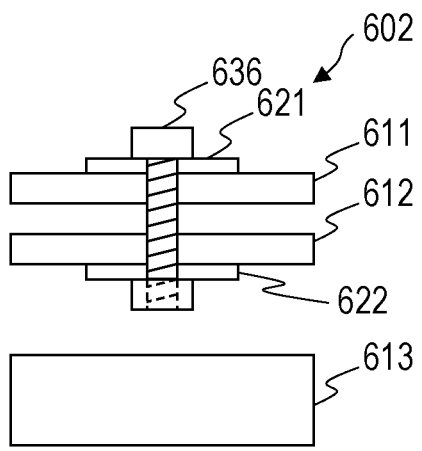
FIG. 6B is a diagram illustrating an example of a CAD image corresponding to second net information.
Figure 6C:
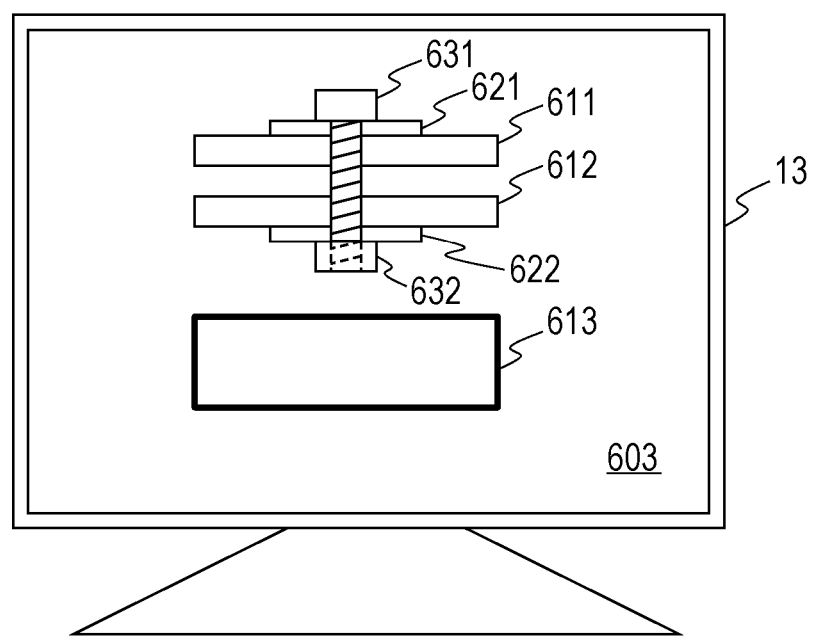
FIG. 6C is a diagram illustrating an example of a difference information image illustrating the difference between the first net information and the second net information.

FIG. 6A is a diagram illustrating an example of a CAD image corresponding to the first net information. FIG. 6B is a diagram illustrating an example of a CAD image corresponding to the second net information. FIG. 6C is a diagram illustrating an example of a difference information image illustrating the difference between the first net information and the second net information.

A first net information image 601 includes a first substrate 611 on which first ground wiring 621 is formed, a second substrate 612 on which second ground wiring 622 is formed, and a metal plate 613. The first net information image 601 further includes a screw 631 passes through the first substrate 611, the second substrate 612, the first ground wiring 621, the second ground wiring 622, and the tip of the screw 631 is threaded into the metal plate 613. The first net information image 601 further includes a bolt 632 screwed with the screw 631 so as to connect to the second ground wiring 622, and a boss 633 screwed with the screw 631 so as to connect to the metal plate 613. The first substrate 611 and the second substrate 612 are parts that are designed by an electrical CAD system, and the metal plate 613, the screw 631, the bolt 632, and the boss 633 are parts that are designed by a mechanism CAD system.

In the first net information corresponding to the first net information image 601, the first ground wiring 621 and the second ground wiring 622 are electrically designed to be electrically connected to the metal plate 613 via the screw 631 so as to become the ground level.

The second net information image 602 differs from the first net information image 601 in that a screw 636 is placed instead of the screw 631, and the boss 633 is not placed. The screw 636 passes through the first substrate 611, the second substrate 612, the first ground wiring 621, and the second ground wiring 622, but the tip of the screw 636 is not threaded into the metal plate 613.

In the second net information corresponding to the second net information image 602, the first ground wiring 621 and the second ground wiring 622 are not electrically connected to the metal plate 613 via the screw 636, and thus the first ground wiring 621 and the second ground wiring 622 might not become the ground level.

A difference information image 603 displayed in the output section 13 is corresponding to the second net information image 602 and includes the first substrate 611, the second substrate 612, the metal plate 613, the first ground wiring 621, the second ground wiring 622, the screw 631, and the bolt 632. In the difference information image 603, the metal plate 613 whose connection relationship between the first net information and the second net information has been changed is highlighted. In the difference information image, a part whose connection relationship has been changed between the first net information and the second net information is highlighted, and thus it is possible for an electrical designer to easily view a part whose connection relationship has been changed.

Figure 7A:
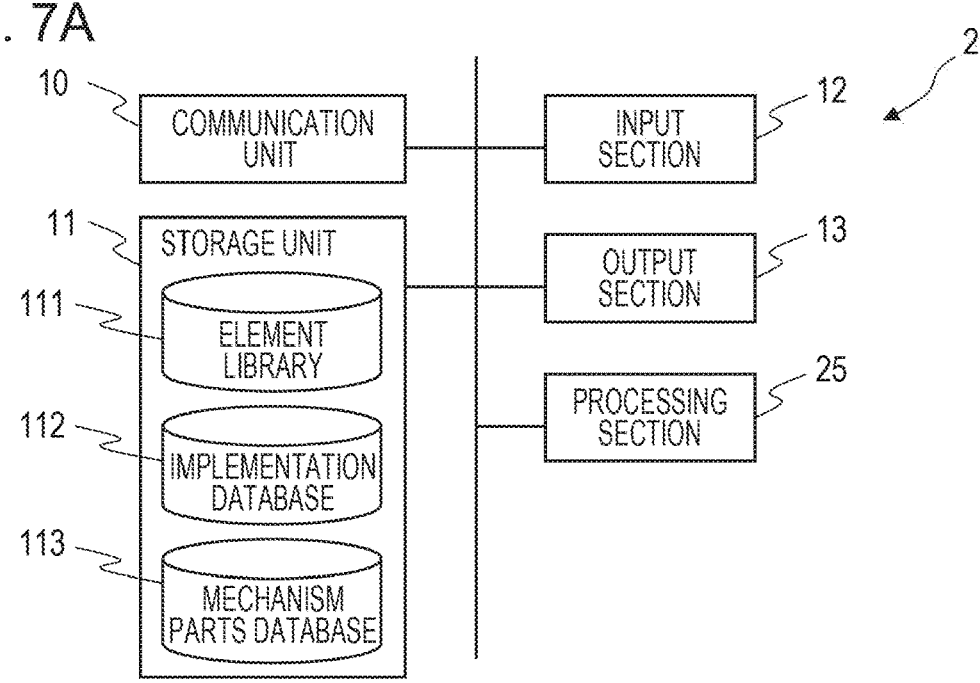
FIG. 7A is a circuit block diagram of an information processing apparatus according to a second embodiment.
Figure 7B:
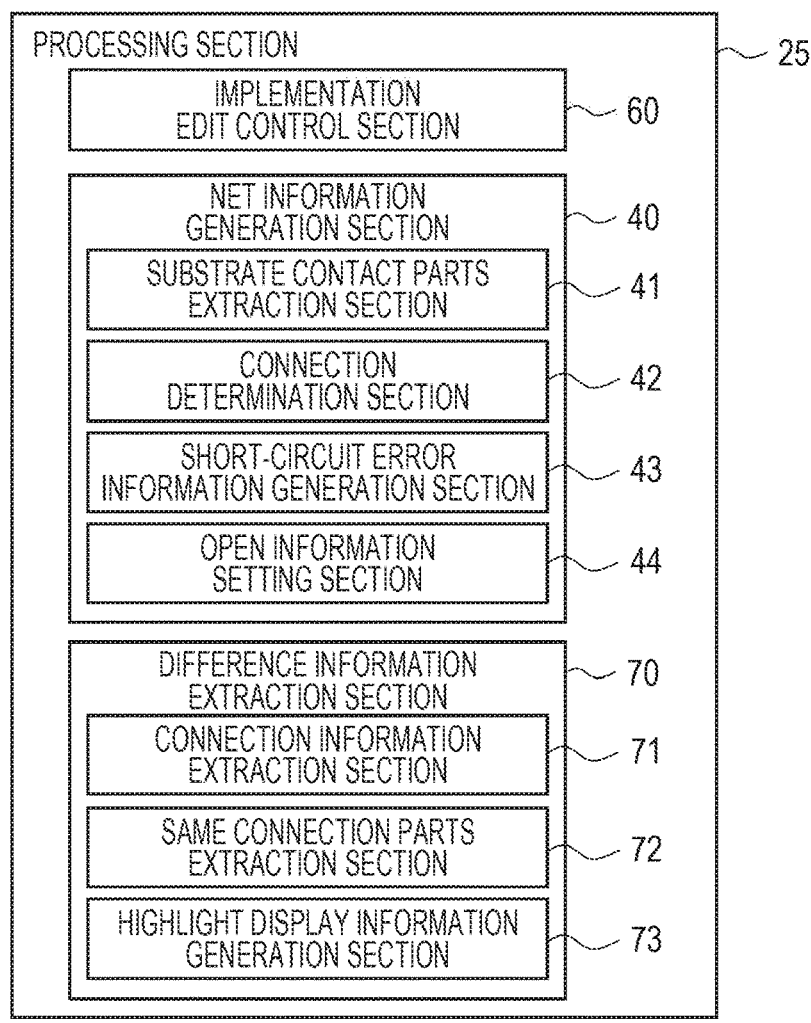
FIG. 7B is a functional block diagram of the processing section illustrated in FIG. 7A.

Configuration and Functions of Information Processing Apparatus According to Second Embodiment FIG. 7A is a circuit block diagram of an information processing apparatus according to a second embodiment. FIG. 7B is a functional block diagram of the processing section illustrated in FIG. 7A.

An information processing apparatus 2 differs from the information processing apparatus 1 in the point of including a processing section 25 in place of the processing section 20. The processing section 25 differs from the processing section 20 in the point of including an implementation edit control unit 60 and a difference information extraction section 70 in place of the implementation edit control unit 30 and the difference information extraction section 50 respectively. The configuration and the functions of the components, other than the implementation edit control section 60 and the difference information extraction section 70, of the information processing apparatus 2 are the same as the configuration and the functions of the components having the same reference numerals of the information processing apparatus 1, and thus detailed descriptions thereof are omitted here. The difference information extraction section 70 includes a connection information extraction section 71, a same connection parts extraction section 72, and a highlight information generation section 73.

Figure 8:
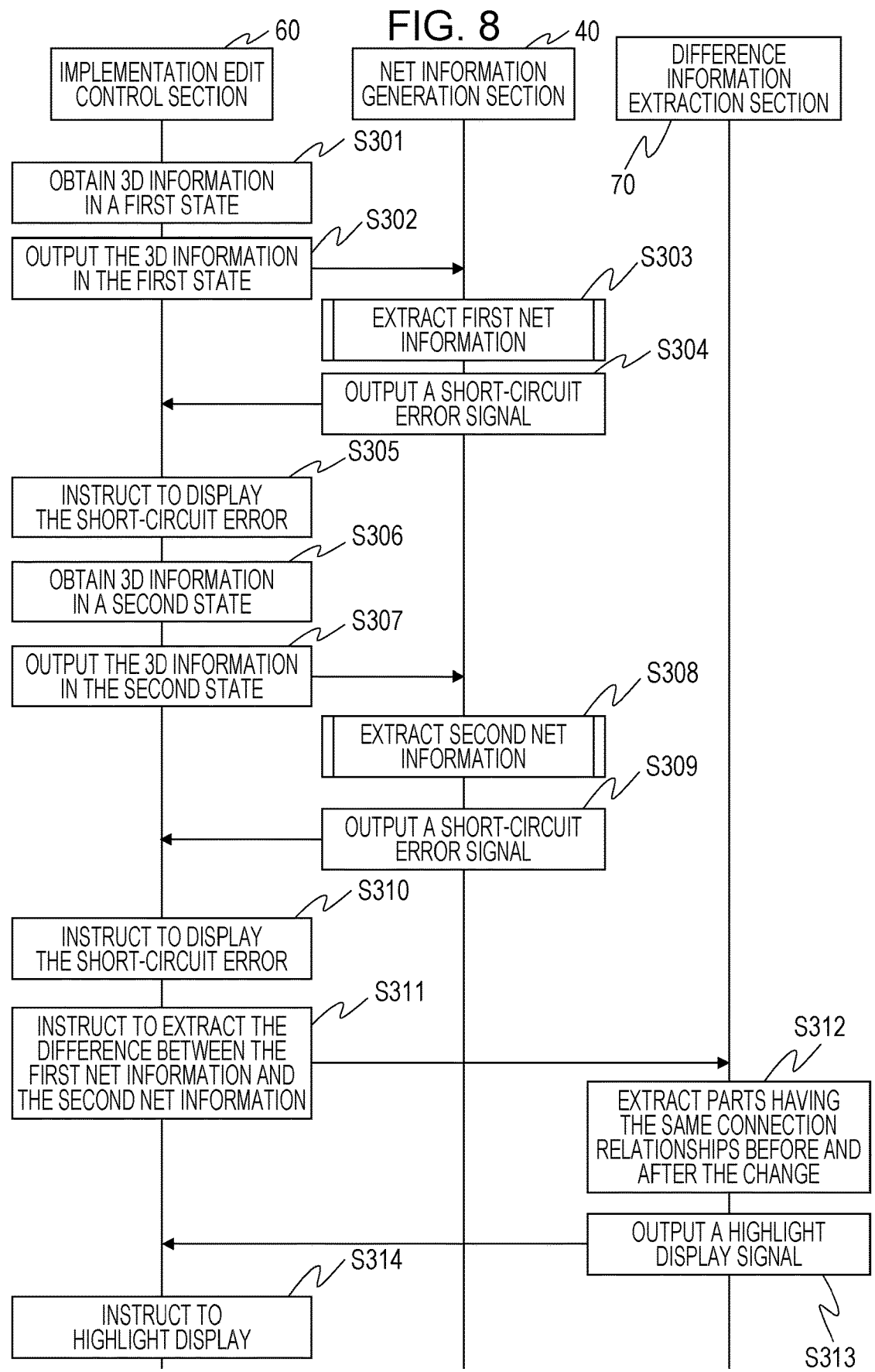
FIG. 8 is a sequence chart of difference information extraction processing performed by the information processing apparatus illustrated in FIGS. 7A and 7B.
Figure 9:
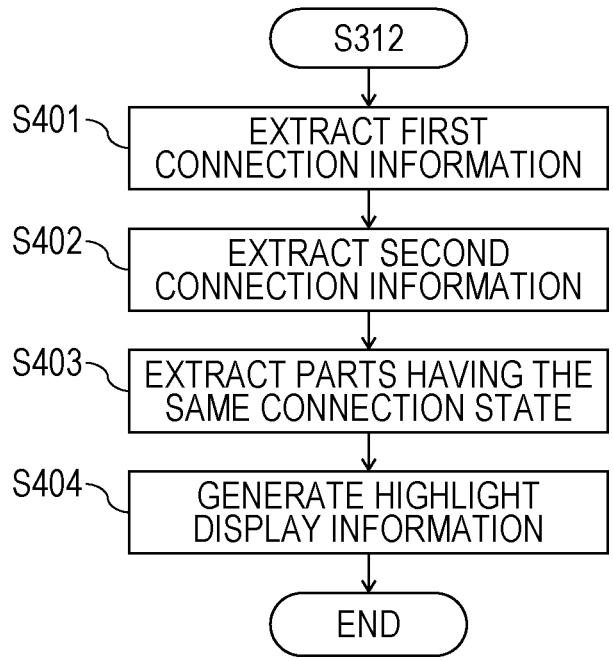
FIG. 9 is a flowchart illustrating more detailed processing of the processing of S312 illustrated in FIG. 8.

Difference information extraction processing by information processing apparatus according to second embodiment FIG. 9 is a sequence chart of difference information extraction processing by the information processing apparatus 2. The difference information extraction processing illustrated in FIG. 8 is performed mainly by the processing section 25 in cooperation with each element of the information processing apparatus 2 based on the program stored in the storage unit 11 in advance.

The processing of S301 to 311 is the same as the processing of S101 to 111, and thus here the detailed description thereof will be omitted. The difference information extraction section 70 extracts a part having a connection relationship that has been changed between the first net information and the second net information, and having the same connection relationships (S312). Next, the difference information extraction section 70 outputs a highlight display signal for indicating that the part extracted by the processing in S312 is to be highlighted (S313). The implementation edit control unit 60 then outputs the highlight display signal for indicating a display instruction of the part highlighted by the highlight display signal to the output section 13 (S314). When the output section 13 receives input of the highlight display signal, the output section 13 displays a highlighted image in which the part having a connection relationship changed between the first net information and the second net information, and having the same connection relationship before and after the change is highlighted.

FIG. 8 is a flowchart illustrating more detailed processing of the processing of S312.

First, the connection information extraction section 71 extracts first connection information for indicating an electrical connection relationship with the printed circuit board in the first state for each of the parts having a different electrical connection relationship between the first net information and the second net information (S401). The connection information extraction section 71 obtains the ID of the net table that was connected before a change of being stored in the mechanism parts table 131 for each of the parts having the change flag of "1" in the mechanism parts table, and groups the parts having the same ID of the net table.

Next, the connection information extraction section 71 extracts second connection information for indicating an electrical connection relationship with the printed circuit board in the second state for each of the parts having a different electrical connection relationship between the first net information and the second net information (S402). The connection information extraction section 71 obtains the ID of the net table stored in the mechanism parts table 131 for each of the parts having the change flag of "1" in the mechanism parts table 131 and groups the parts having the same ID of the net table.

Next, the same connection parts extraction section 72 extracts parts having the same electrical connection relationship between the first connection information extracted by the processing of S401 and the second connection information extracted by the processing of S402 (S403). The same connection parts extraction section 72 extracts the parts grouped into the same group by the processing of S401 and S402. By performing the processing of S401 to S403, the parts having the same net before and after the change out of the parts having a connection relationship changed. For example, if both of the parts A and B are connected to the ground wiring in the first net information and connected to the first signal line in the second net information, the parts A and B are extracted as the parts having the same net before and after the change of the connection relationship.

The highlight information generation section 73 then generates highlight information for indicating that the parts extracted from the processing of S403 are highlighted (S404).

Operational Advantage of Heat Generation Density Calculation Method According to Second Embodiment With the information processing apparatus according to the second embodiment, the parts having the same connection relationship before and after the change between the first net information and the second net information are highlighted. Accordingly, it is possible for an electrical designer to easily view the parts having the same connection relationship before and after the change between the first net information and the second net information.

Figure 10:
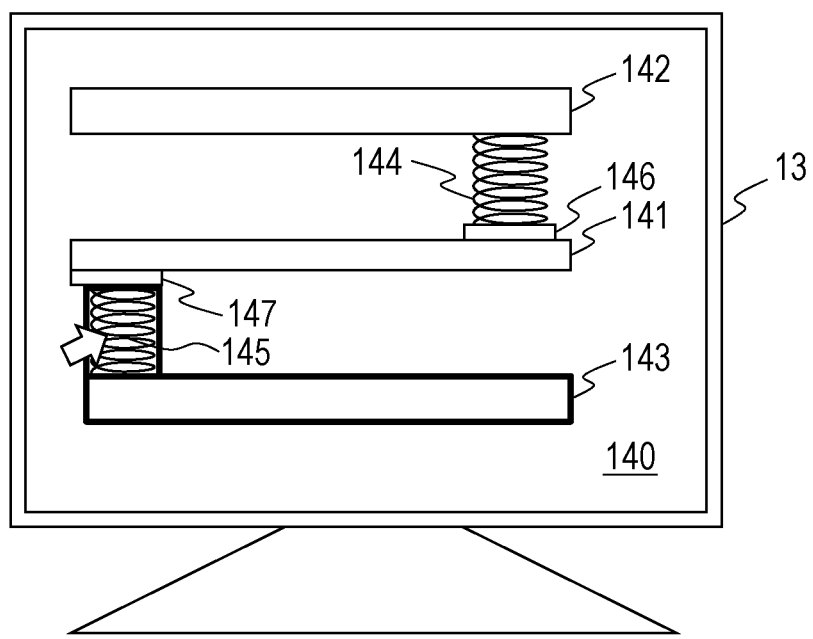
FIG. 10 is a diagram illustrating an example of a highlighted image in which parts having the same connection relationship before and after a change between first net information and second net information are highlighted.

FIG. 10 is a diagram illustrating an example of a highlighted image in which parts having the same connection relationship before and after a change between first net information and second net information are highlighted.

The highlighted image 140 displayed on the output section 13 includes a printed circuit board 141, a first metal plate 142, a second metal plate 143, a first spring 144, and a second spring 145. A first wiring line 146 is placed on one of the faces of the printed circuit board 141, and a second wiring line 147 is formed on the other of the faces of the printed circuit board 141. The first wiring line 146 is a ground wiring line that is electrically connected to the first metal plate 142 via the first spring 144. On the other hand, the second wiring line 147 is a wiring line that is electrically connected to the second metal plate 143 via the second spring 145, and was a ground wiring line in the first net information, but has been changed to a signal wiring line in the second net information. The second metal plate 143 and the second spring 145 are electrically connected to the second wiring line 147 and thus change in accordance with a change of the net information of the second wiring line 147.

In the information processing apparatus 2, when an electrical designer who is not illustrated in FIG. 10 selects the second spring 145, the second metal plate 143, which is the part having the same connection relationship before and after the change between the first net information and the second net information, and the second spring 145 are both highlighted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process, the process comprising:
    when a plurality of parts to be placed on a periphery of a printed circuit board are placed in a first state, extracting first information for indicating a first electrical connection relationship between the printed circuit board and the plurality of parts based on shape information for indicating shapes of the plurality of parts, placement information for indicating placement positions of the plurality of parts on the periphery of the printed circuit board, and material information for indicating materials of the plurality of parts;
    when the plurality of parts are placed in a second state different from the first state, extracting second information for indicating a second electrical connection relationship between the printed circuit board and the plurality of parts based on the shape information for indicating the shapes of the plurality of parts, placement information for indicating placement positions of the plurality of parts on the periphery of the printed circuit board, and material information for indicating materials of the plurality of parts;
    extracting parts of the plurality of parts having a different electrical connection relationship between the first information and the second information; and
    outputting a display signal to highlight the different electrical connection relationship between the first information and the second information for the extracted parts.

2. The non-transitory, computer-readable recording medium having stored an electrical design support program in accordance to claim 1, further comprising:
    for each part of the parts having the different electrical connection relationship between first net information and second net information, extracting first connection information for indicating the first electrical connection relationship with the printed circuit board in the first state;
    for each part of the parts having a different electrical connection relationship between the first net information and the second net information, extracting second connection information for indicating the second electrical connection relationship with the printed circuit board in the second state;
    extracting parts of the plurality of parts having a same electrical connection relationship corresponding to both the first connection information and the second connection information; and
    outputting a display signal to highlight the extracted parts having the same electrical connection relationship corresponding to both of the first connection information and the second connection information.

3. The non-transitory, computer-readable recording medium having stored an electrical design support program in accordance to claim 1, further comprising:
    determining whether or not a short circuit has occurred based on whether or not each part of the plurality of parts is in contact with any one of the printed circuit board and elements mounted on the printed circuit board; and
    when a short circuit is determined to have occurred, outputting a short error display signal.

4. An electrical design support method of using a computer readable program to cause a computer to perform processing a process, the process comprising:
    when a plurality of parts to be placed on a periphery of a printed circuit board are placed in a first state, extracting first information for indicating a first electrical connection relationship between the printed circuit board and the plurality of parts based on shape information for indicating shapes of the plurality of parts, placement information for indicating placement positions of the plurality of parts on the periphery of the printed circuit board, and material information for indicating materials of the plurality of parts;
    when the plurality of parts are placed in a second state different from the first state, extracting second information for indicating a second electrical connection relationship between the printed circuit board and the plurality of parts based on the shape information for indicating the shapes of the plurality of parts, placement information for indicating placement positions of the plurality of parts on the periphery of the printed circuit board, and material information for indicating materials of the plurality of parts;
    extracting parts of the plurality of parts having a different electrical connection relationship between the first information and the second information; and
    outputting a display signal to highlight the different electrical connection relationship between the first information and the second information for the extracted parts.

5. An information processing apparatus comprising:
    a processor; and
    a memory;
    the processor being coupled to the memory and configured to:
        when a plurality of parts to be placed on a periphery of a printed circuit board are placed in a first state, extract first information for indicating a first electrical connection relationship between the printed circuit board and the plurality of parts based on shape information for indicating shapes of the plurality of parts, placement information for indicating placement positions of the plurality of parts on the periphery of the printed circuit board, and material information for indicating materials of the plurality of parts,
        when the plurality of parts are placed in a second state different from the first state, extract second information for indicating a second electrical connection relationship between the printed circuit board and the plurality of parts based on the shape information for indicating the shapes of the plurality of parts, placement information for indicating placement positions of the plurality of parts on the periphery of the printed circuit board, and material information for indicating materials of the plurality of parts, extract parts of the plurality of parts having a different electrical connection relationship between the first information and the second information, and output a display signal to highlight the different electrical connection relationship between the first information and the second information for the extracted parts.

6. An information processing apparatus comprising:

a processor; and a memory;

the processor being coupled to the memory and configured to:

obtain first three-dimensional (3-D) information for a plurality of parts to be placed in a first state on a printed circuit board, extract the first 3-D information for indicating a first electrical connection relationship between the printed circuit board and the plurality of parts based on shape information for indicating shapes of the plurality of parts, placement information for indicating placement positions of the plurality of parts on the printed circuit board, and material information for indicating materials of the plurality of parts, obtain second three-dimensional (3-D) information for another plurality of parts to be placed in a second state different from the first state on another printed circuit board;

extract the second 3-D information for indicating a second electrical connection relationship between said another printed circuit board and said another plurality of parts based on shape information for indicating the shapes of said another plurality of parts, placement information for indicating placement positions of said another plurality of parts on said another printed circuit board, and material information for indicating materials of said another plurality of parts, extract parts among the plurality of parts and said another plurality of parts having a different electrical connection relationship between the first 3-D information and the second 3-D information, and output a display signal to highlight the different electrical connection relationship for the extracted parts to a display.

* * * * *